(12) United States Patent
Körner

(10) Patent No.: US 7,728,779 B2
(45) Date of Patent: Jun. 1, 2010

(54) COMBINED MICROPHONE AND RADIO-FREQUENCY ANTENNA MODULES

(75) Inventor: Hans Peter Körner, Lund (SE)

(73) Assignee: Sony Ericsson Mobile Communications AB (SE)

(*) Notice: Subject to any disclaimer, the term of this patent is extended or adjusted under 35 U.S.C. 154(b) by 258 days.

(21) Appl. No.: 11/968,676

(22) Filed: Jan. 3, 2008

(65) Prior Publication Data

US 2009/0174610 A1 Jul. 9, 2009

(51) Int. Cl.
*H01Q 1/24* (2006.01)
(52) U.S. Cl. .................... 343/702; 343/700 MS
(58) Field of Classification Search .......... 343/702, 343/700 MS; 455/90.3, 575.1, 575.3, 575.4, 455/575.7
See application file for complete search history.

(56) References Cited

U.S. PATENT DOCUMENTS

| | | | |
|---|---|---|---|
| 6,353,443 B1 | 3/2002 | Ying | |
| 6,430,217 B1 | 8/2002 | Suzuki et al. | |
| 6,538,604 B1 | 3/2003 | Isohätälä et al. | |
| 6,738,023 B2 | 5/2004 | Scott et al. | |
| 6,865,276 B1 | 3/2005 | Ljungberg et al. | |
| 6,943,733 B2 | 9/2005 | Vance | |
| 6,980,154 B2 | 12/2005 | Vance et al. | |
| 6,995,715 B2 | 2/2006 | Ying et al. | |
| 7,102,577 B2 * | 9/2006 | Richard et al. | 343/702 |
| 7,243,851 B2 * | 7/2007 | Zhu et al. | 235/472.02 |
| 7,398,072 B2 * | 7/2008 | Corrigan et al. | 455/301 |
| 2002/0123308 A1 | 9/2002 | Feltstrom | |
| 2006/0068856 A1 | 3/2006 | Zhu et al. | |
| 2006/0099914 A1 | 5/2006 | Andersson | |

FOREIGN PATENT DOCUMENTS

| | | |
|---|---|---|
| EP | 1 164 725 A1 | 12/2001 |
| WO | WO 03/030297 A1 | 4/2003 |

OTHER PUBLICATIONS

Notification of Transmittal of the International Search Report and the Written Opinion of the International Searching Authority, or the Declaration, International Search Report, Written Opinion of the International Searching Authority, PCT/EP2008/055609, Aug. 4, 2008.

* cited by examiner

*Primary Examiner*—Hoang V Nguyen
(74) *Attorney, Agent, or Firm*—Myers Bigel Sibley & Sajovec, P.A.

(57) ABSTRACT

Electronic devices and wireless communication terminals include a unitary circuit board on which a radio-frequency (RF) antenna and a microphone are attached. The RF antenna includes a radiating plane and a ground plane. A feed line on the circuit board is connected to the radiating plane, and a ground line on the circuit board is connected to the ground plane. The microphone and the RF antenna are spaced apart on the circuit board by a distance of less than a half wavelength of a resonant frequency of the radiating plane. The microphone generates a microphone signal through a pair of microphone lines on the circuit board.

18 Claims, 4 Drawing Sheets

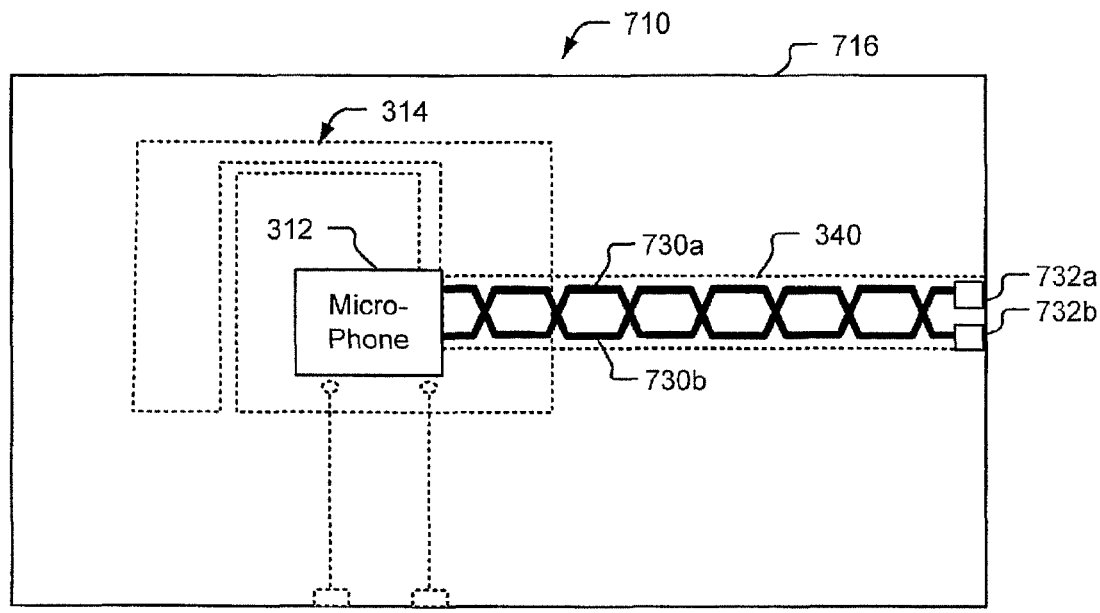
FIGURE 7
FIGURE 8
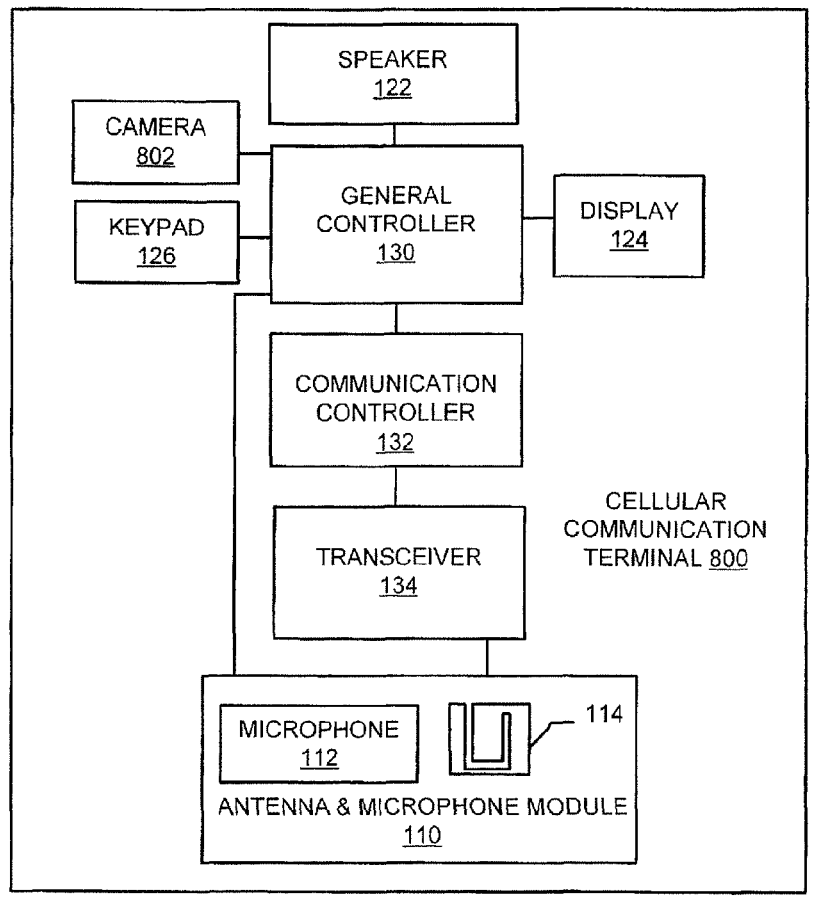

COMBINED MICROPHONE AND RADIO-FREQUENCY ANTENNA MODULES

BACKGROUND

The present invention relates to the field of communications, and, more particularly, to wireless terminals incorporating antennas and microphones.

Many digital wireless systems in use today utilize a time slotted access system. An information signal (e.g., speech, data, video) is segmented, compressed, packetized and transmitted in a pre-allocated time slot. Time slots can be allocated to different users, a scheme commonly referred to as Time Division Multiple Access (TDMA). TDMA communication systems, such as the Global System for Mobile communications (GSM) in Europe, the Digital-Advanced Mobile Phone System (D-AMPS) system in North America, or the Personal Digital Cellular (PDC) system in Japan, allow a single radio frequency channel to be shared between multiple remote terminals, thereby increasing the capacity of the communication system. Also, Code Division Multiple Access (CDMA) access techniques use a framing structure to gather and transmit information across an air interface.

Time slots may also be allocated between alternating uplink and downlink transmissions, a scheme commonly referred to as Time Division Duplex (TDD). In a TDD system, the transmitter is inactive for a period of time during each frame, which period is of sufficient duration to receive a signal burst.

Such periodic transmission can generate electrical interference at the switching frequency, referred to herein as a fundamental frequency and its harmonic frequencies. For example, in a GSM system, the antenna and associated transceiver circuits are switched on and off at a fundamental frequency of approximately 217 Hz.

The electrical interference can become coupled into the microphone circuitry where it can add an audible buzz to a speech signal that can be heard by a user at a receiving terminal, which can be referred to as "bumblebee" noise in the speech signal. The audible buzz may occur and the fundamental frequency and/or at the harmonic frequencies.

Some existing wireless terminals attempt to suppress bumblebee noise by locating the antenna and the microphone at extreme opposite ends of the wireless terminal (e.g., locating the antenna at the top and the microphone at the bottom of the terminal) to reduce electrical coupling there between. Also analog/digital filters, such as digital interference cancellers, may be used to suppress bumblebee noise.

Accordingly, the need to suppress bumblebee noise may not only constrain the permissible locations of various components within a wireless terminal, it may necessitate the use of filtering circuitry that is specifically and uniquely designed for each different wireless terminal model to compensate for the unique electrical interference characteristics therein.

SUMMARY

Some embodiments of the present invention provide an electronic device that includes: a unitary circuit board; a radio-frequency (RF) antenna attached to the circuit board and including a radiating plane and a ground plane, where a feed line on the circuit board is connected to the radiating plane and a ground line on the circuit board is connected to the ground plane; and a microphone attached to the circuit board and spaced apart from the RF antenna by a distance of less than a half wavelength of a resonant frequency of the radiating plane, where the microphone is configured to generate a microphone signal through a pair of microphone lines on the circuit board.

In some further embodiments, the RF antenna and the microphone are attached to opposite sides of the circuit board.

In some further embodiments, the RF antenna and the microphone are substantially aligned to one another on the opposite sides of the circuit board.

In some further embodiments, the radiating plane includes a planar F radiating plane; and the pair of microphone lines extend away from the RF antenna along a major length thereof in a direction perpendicular to a direction of major resonant current flow in the planar F radiating plane while transmitting to reduce electrical interference from the radiating plane that is combined with the microphone signal on the microphone lines.

In some further embodiments, the pair of microphone lines extend parallel to one another and one of the microphone lines overlies the other one of the microphone lines with an insulation material therebetween to increase balance between the microphone lines in the amount of electrical interference from the radiating plane that is combined with the microphone signal on the microphone lines.

In some further embodiments, one of the microphone lines forms a serpentine pattern on the circuit board and repetitively crosses over/under the other one of the microphone lines at distances that are less than one twenty-fourth of a wavelength of the resonant frequency of the radiating plane to increase balance between the microphone lines in the amount of electrical interference from the radiating plane that is combined with the microphone signal on the microphone lines.

In some further embodiments, both of the microphone lines form a serpentine pattern on the circuit board that repetitively crosses over/under one another at distances that are less than one twenty-fourth of a wavelength of the resonant frequency of the radiating plane to increase balance between the microphone lines in the amount of electrical interference from the radiating plane that is combined with the microphone signal on the microphone lines.

In some further embodiments, the pair of microphone lines extend parallel to one another and form a serpentine pattern primarily extending in a longitudinal direction on the circuit board and which reverses direction in a lateral direction at distances that are less than one twenty-fourth of the wavelength of the resonant frequency of the radiating plane to increase balance between the microphone lines in the amount of electrical interference from the radiating plane that is combined with the microphone signal on the microphone lines.

In some further embodiments, the microphone includes a microelectrical-mechanical system (MEMS) device that is attached to the circuit board at a distance from the RF antenna of no more than one thirty-second of a wavelength of the resonant frequency of the radiating plane.

In some further embodiments, the electronic device further includes: a transmitter circuit configured to drive the radiating plane through the feed and ground lines to transmit RF signals therefrom; and a communication encoder connected to the transmitter circuit and configured to encode communication signals for transmission by the radiating plane.

In some further embodiments, the transmitter circuit is configured to drive the radiating plane through the feed and ground lines to transmit RF signals at a cellular communication frequency.

In some further embodiments, the feed and ground lines are parallel to one another and extend along a major length thereof in a direction that is perpendicular to a major length of the pair of microphone lines to reduce electrical interference from the feed and ground lines that is combined with the microphone signal on the microphone lines.

In some further embodiments, the electronic device further includes: a speaker; and a mobile terminal housing, wherein the speaker is positioned within a top portion of the mobile terminal housing, the RF antenna and microphone are positioned within an opposite bottom portion of the mobile terminal housing, and the transmitter circuit and the communication encoder are enclosed with the mobile terminal housing.

Some other embodiments of the present invention provide a wireless communication terminal that includes: a unitary circuit board; a RF antenna attached to the circuit board and including a radiating plane and a ground plane, wherein a feed line on the circuit board is connected to the radiating plane and a ground line on the circuit board is connected to the ground plane; a microphone attached to the circuit board and spaced apart from the RF antenna by a distance of less than a half wavelength of a resonant frequency of the radiating plane, where the microphone is configured to generate a microphone signal through a pair of microphone lines on the circuit board; a transmitter circuit configured to drive the radiating plane through the feed and ground lines to transmit RF signals at a cellular communication frequency therefrom; and a communication encoder connected to the transmitter circuit and configured to encode communication signals for transmission by the radiating plane.

In some further embodiments, the RF antenna and the microphone are attached to opposite sides of the circuit board.

In some further embodiments, the pair of microphone lines extend parallel to one another and one of the microphone lines overlies the other one of the microphone lines with an insulation material therebetween to increase balance between the microphone lines in the amount of electrical interference from the radiating plane that is combined with the microphone signal on the microphone lines.

In some further embodiments, both of the microphone lines form a serpentine pattern on the circuit board that repetitively crosses over/under one another at distances that are less than one twenty-fourth of a wavelength of the resonant frequency of the radiating plane to increase balance between the microphone lines in the amount of electrical interference from the radiating plane that is combined with the microphone signal on the microphone lines.

In some further embodiments, the RF antenna and the microphone are attached to opposite sides of the circuit board.

In some further embodiments, the transmitter circuit is configured to drive the radiating plane through the feed and ground lines to transmit RF signals at a cellular communication frequency.

Some other embodiments of the present invention provide a wireless communication terminal that includes: a unitary circuit board; a RF antenna attached to the circuit board and including a radiating plane and a ground plane, where a feed line on the circuit board is connected to the radiating plane and a ground line on the circuit board is connected to the ground plane; a microphone attached to the circuit board and spaced apart from the RF antenna by a distance of less than a half wavelength of a resonant frequency of the radiating plane, where the microphone is configured to generate a microphone signal through a pair of microphone lines on the circuit board; a transmitter circuit configured to drive the radiating plane through the feed and ground lines to transmit RF signals at a cellular communication frequency therefrom; a communication encoder connected to the transmitter circuit and configured to encode communication signals for transmission by the radiating plane; and a differential amplifier that differentially combines the microphone signal on the microphone lines to generate a differential microphone signal. The RF antenna and the microphone are attached to opposite sides of the circuit board. The pair of microphone lines extend away from the RF antenna along a major length thereof in a direction perpendicular to a direction of major resonant current flow in the planar F radiating plane while transmitting to reduce electrical interference from the radiating plane that is combined with the microphone signal on the microphone lines. Both of the microphone lines form a serpentine pattern on the circuit board that repetitively crosses over/under one another at distances that are less than one twenty-fourth of a wavelength of the resonant frequency of the radiating plane to increase balance between the microphone lines in the amount of electrical interference from the radiating plane that is combined with the microphone signal on the microphone lines and increase an amount of common mode rejection of the electrical interference by the differential amplifier.

Other wireless terminals, methods, and/or systems according to embodiments of the invention will be or become apparent to one with skill in the art upon review of the following drawings and detailed description. It is intended that all such additional terminals, methods, and/or systems be included within this description, be within the scope of the present invention, and be protected by the accompanying claims.

BRIEF DESCRIPTION OF THE DRAWINGS

FIG. 7 is a front view of another combined microphone and antenna module including a unitary circuit board with a RF antenna and a microphone attached to opposite sides thereof in accordance with some other embodiments of the present invention.

FIG. 8 is a block diagram of a wireless communication terminal with a combined antenna and microphone module in accordance with some embodiments of the present invention.

DETAILED DESCRIPTION OF EMBODIMENTS

Figure 1:
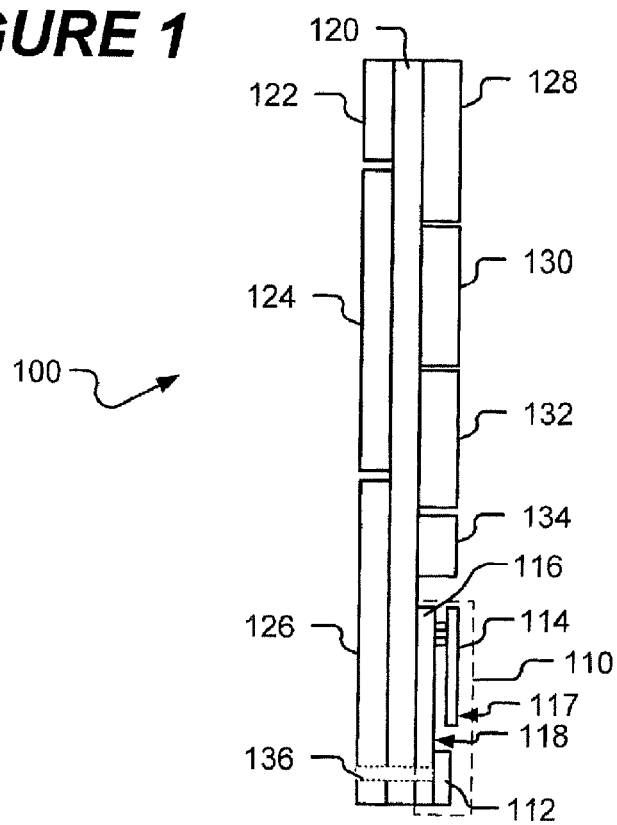
FIG. 1 is a side view of components within a wireless communication terminal, and illustrates a combined antenna and microphone module in accordance with some embodiments of the present invention.

The present invention will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures. In the drawings, the size/thickness of lines, layers, features, components and/or regions may be exaggerated for ease of illustration and description.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "attached/connected" to another element, it can be directly responsive or connected to the other element, or intervening elements may be present. In contrast, when an element is referred to as being "directly responsive" or "directly attached/connected" to another element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

Some embodiments are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

For purposes of illustration and explanation only, various embodiments of the present invention are described herein in the context of wireless communication terminals ("wireless terminals") that are configured to carry out cellular communications (e.g., cellular voice and/or data communications). It will be understood, however, that the present invention is not limited to such embodiments and may be embodied generally in any wireless terminal that includes a RF antenna that while transmitting may cause interference, such as bumble-bee noise, in a microphone signal.

FIG. 1 is a side view of components that can be included within a wireless terminal 100, and which illustrates a combined antenna and microphone module 110 (within the dashed box) in accordance with some embodiments of the present invention. Referring to FIG. 1, the wireless terminal 100 includes a printed circuit board 120 that interconnects and provides structural support for various components of the wireless terminal 100. The wireless terminal 100 can include opposing first and second primary surfaces, which may descriptively be termed front and back sides. In the exemplary embodiment, a speaker 122, a display 124, and a keypad 126 are connected to the front side of the printed circuit board 120. A battery 128, a general controller 130, a communication controller 132, a transceiver 134, and the combined antenna and microphone module 110 are attached to the back side of the printed circuit board 120. It is to be understood that the relative size/thickness of the illustrated components may be exaggerated for ease of illustration and description.

The combined antenna and microphone module 110 includes a microphone 112 and an antenna 114 that are attached to the same side of a unitary circuit board 116. As used herein, the term "unitary circuit board" refers to a single unit circuit board shared by the components attached thereto. The antenna 114 typically includes a conductive radiating plane 117 that is spaced apart from a conductive ground plane 118. The conductive ground plane 118 can be defined as a conductive pattern printed or otherwise defined on the circuit board 116.

As illustrated, the combined antenna and microphone module 110 can be positioned along a bottom portion of the wireless terminal 100, which may allow more optimal placement of the other components attached to the print circuit board 120 so as to enable development of a more highly integrated and compact size wireless terminal 100. For example, by positioning the combined antenna and microphone module 110 along a bottom portion of the wireless terminal 100 opposite to the keypad 126, the thickness and/or length of the wireless terminal 100 may be reduced relative to if the antenna 14 were more distantly spaced apart from the microphone 112 (e.g., opposite the speaker 122). An aperture opening/acoustic channel 136 may be defined through a portion of the keypad 126, the printed circuit board 120, and the circuit board 116 and configured to guide incident sound from a front surface of the wireless terminal 100 to the microphone 112.

The microphone 112 generates a microphone signal which is conducted through microphone lines extending on the circuit board 120 (e.g., printed microphone lines of the circuit board). The very close spacing between the microphone 112 and the antenna 114, and result in the microphone 112 and its associated microphone lines being subjected to a substantial level of electrical interference from the antenna 114. Because the antenna 114 and the microphone 112 are attached to the same circuit board 116, the relative orientation between the antenna 114 and the microphone 112 and/or the microphone lines can be defined and constrained so as to reduce the amount electrical interference from the antenna 114 that is coupled into the microphone signal. Additionally or alternatively, analog and/or digital filters may be included on the circuit board 116 to filter electrical interference in the microphone signal. For example, an analog/digital notch filter and/or a periodic blanking filter may be connected to the microphone lines and tuned to filter electrical interference at the fundamental frequency and/or resonant frequencies and harmonics of the electrical interference created when the antenna 114 transmits.

As will be appreciated in view of the present description, determining the relative orientation between the antenna 114, the microphone 112, and/or the microphone lines that will reduce the amount electrical interference from the antenna 114 that is coupled into the microphone signal, and/or designing an analog/digital filter to reduce the unique characteristics of electrical interference in the microphone signal can be time-consuming. Moreover, small changes in the characteristics of the antenna 114, the microphone 112, and/or the antenna lines and/or the relative orientation between these components may unfortunately result in an unacceptable increase in the amount of electrical interference that is coupled into the microphone signal. However, because the microphone 112, the antenna 114, and the microphone lines are fixed to the same the circuit board 116, once the components are configured so as to reduce electrical interference in the microphone signal, the combined microphone and antenna module 110 can be reused across many different wireless terminal platform types without necessitating the redesign of the module 110.

According to some nonlimiting embodiments, the antenna 114 can be configured to operate at a plurality of frequency bands, and may be configured as a planar inverted F-antenna (PIFA) or a reverse-fed PIFA (RFPIFA). The antenna may not be strictly "planar" although in the vernacular of the art, it might still be referred to as a PIFA/RFPIFA. The composition, location, and relative orientation of the radiating element 117 and the ground plane 118 may be configured as described in U.S. Pat. Nos. 6,538,604; 6,943,733; and/or 6,980,154, the contents of each of which are hereby incorporated by reference as if recited in full herein. Alternatively, the antenna 114 may be configured as a spiral antenna or another type of transmission RF antenna.

The RF antenna 114 can be configured to operate within multiple frequency bands to enable communications with a plurality of different communication devices and systems. For example, the RF antenna 114 many be configured to operate in different band segments within (i.e., be tuned to provide resonant frequencies within) an exemplary frequency range of 800 MHz-4000 MHz. For example, GSM mobile telephone systems typically operate at a low frequency band, such as between 880 MHz and 960 MHz. Digital Communications System (DCS) mobile telephone systems typically operate at higher frequency bands, such as between 1710 MHz and 1880 MHz. Personal Communications Services (PCS) mobile telephone systems typically operate between 1850 MHz and 1990 MHz. Universal Mobile Telephony Systems (UMTS) typically operate in the 2 GHz range. Bluetooth and Wireless Local Area Network wireless devices typically operate in the industrial, scientific and medical (ISM) frequency band and, more particularly, generally between 2.4-2.48 GHz. The RF antenna 314 can be configured to generate resonant currents therein that transmit RF signals in one or more of these frequency bands. For example, the dimensions of the radiating plane 117 may be defined based on the wavelength for the lower frequency band for which the RF antenna 114 is tuned (e.g., one-fourth of the wavelength for the lower frequency band).

According to some further nonlimiting embodiments, the microphone 112 may include a microelectrical-mechanical system (MEMS) device, which can include a pressure-sensitive diaphragm formed on a silicon substrate, and/or an electret condenser microphone (ECM) device that is configured to generate a microphone signal which is indicative of sensed audible signals. A MEMS microphone can have a much smaller size than the RF antenna 114 and, accordingly, can be closely spaced thereto to provide a small combined module 110. For example, the RF antenna 114 may at least partially overlap or underlie the microphone 112 to reduce the footprint of the combined module 110 on the printed circuit board 120 and/or the thickness of the combined module 110. MEMS and ECM type microphones are well known and, accordingly, further description of exemplary microphone 112 configurations is omitted for sake of brevity.

Figure 2:
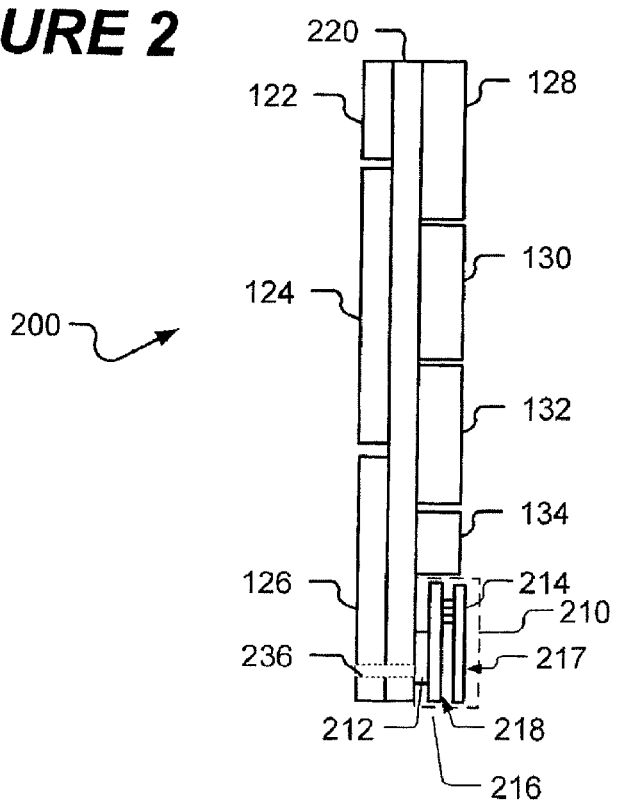
FIG. 2 is a side view of components within a wireless communication terminal, and illustrates a combined antenna and microphone module in accordance with some other embodiments of the present invention.

FIG. 2 is a side view of components that can be included within another wireless terminal 200, and which illustrates another embodiment of a combined antenna and microphone module 210. The wireless terminal 200 is similar to and can include many of the same components as the wireless terminal 100 of FIG. 1, with a primary difference being the configuration of a combined microphone and antenna module 210. Referring to FIG. 2, the wireless terminal 200 includes a printed circuit board 220 that interconnects and provides structural support for a speaker 122, a display 124, and a keypad 126 which are connected to a front side of the printed circuit board 220. A battery 128, a general controller 130, a communication controller 132, a transceiver 134, and the combined antenna and microphone module 210 are attached to a back side of the printed circuit board 220. It is to be understood that the relative size/thickness of the illustrated components may be exaggerated for ease of illustration and description.

The combined microphone and antenna module 210 includes a microphone 212 and an antenna 214 attached to opposite sides of a unitary circuit board 216. The microphone 212 may be configured in a similar manner to the microphone 112 of FIG. 1. An aperture opening/acoustic channel 236 may be defined through a portion of the keypad 126 and the printed circuit board 220 and configured to guide incident sound from a front surface of the wireless terminal 200 to the microphone 212. Because the microphone 212 and the antenna 214 are attached to opposite sides of the circuit board 216, the module 210 may be more compact and use less surface area of the printed circuit 216, and may thereby enable further size reduction in the wireless terminal 200.

The antenna 214 can include a conductive radiating plane 217 that is spaced apart from a conductive ground plane 218. The antenna 214 may be configured similarly to the antenna 114 of FIG. 1. The conductive ground plane 218 can be defined as a conductive pattern printed or otherwise defined on the circuit board 216. The circuit board 216 may include a conductive shielding layer that is positioned between the microphone 212 and the ground plane 218 to reduce coupling of the electrical interference from the radiating plane 217 into the microphone signal. Accordingly, positioning the microphone 212 and the antenna 214 on opposite sides of the circuit board 218 may enable further shielding of electrical interference from the microphone signal.

Figure 3:
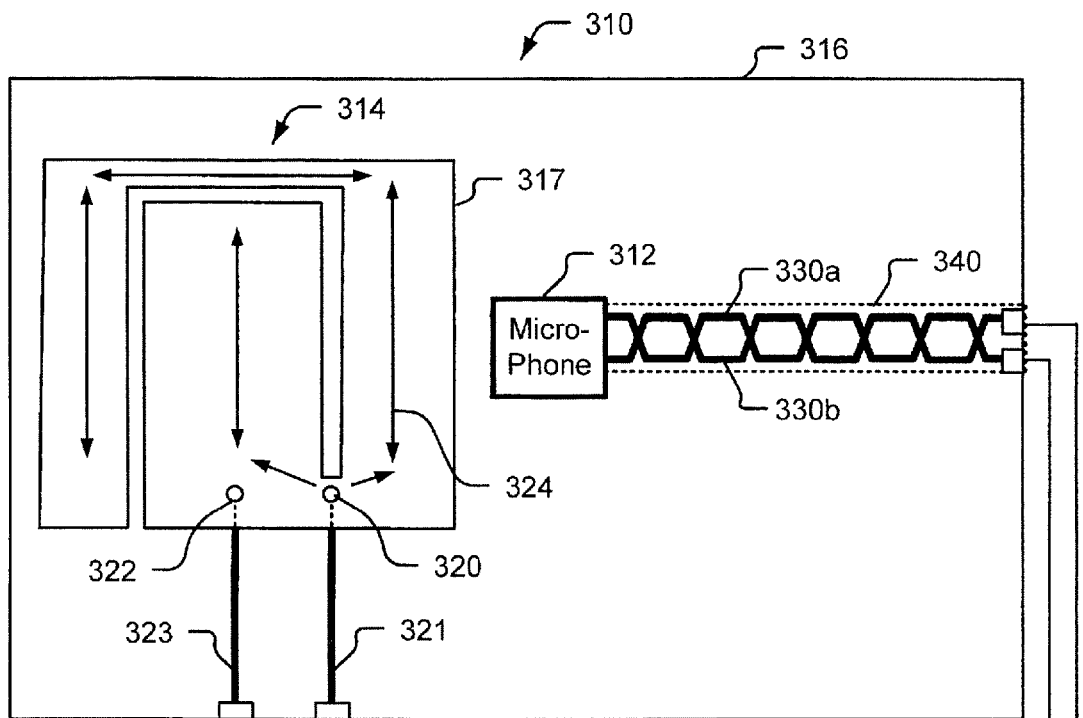
FIG. 3 is a front view of an exemplary combined microphone and antenna module that includes a unitary circuit board with a RF antenna and a microphone attached thereto in accordance with some embodiments of the present invention.

FIG. 3 is a front view of a combined microphone and antenna module 310 that includes a unitary circuit board 316 with a RF antenna 314 and a microphone 312 attached thereto in accordance with some embodiments of the present invention. The RF antenna 314 may be configured similarly to the RF antenna 114 of FIG. 1, and the microphone 312 may be configured similarly to the microphone 112 in FIG. 1. It is to be understood that the relative size/thickness of the illustrated components may be exaggerated for ease of illustration and description.

Referring to FIG. 3, the exemplary RF antenna 314 is configured as a PIFA antenna that includes a radiating plane 317 that is substantially parallel to and closely spaced apart (e.g., 7-10 mm) from a ground plane formed on (e.g., printed on) or within the circuit board 316. A RF signal that is to be transmitted is conducted through a feed line 321 to a feed node 320 on the radiating plane 317 that causes resonant currents to be conducted through and radiate from the radiating plane 317. The radiating plane 317 is grounded through a grounding node 322 that is connected to a grounding line 323. The relative positioning of the feed node 320 and the grounding node 322 is defined so as to provide a desired voltage standing wave ratio (VSWR) in the radiating plane 317. The feed line 321 and the grounding line 323 can be connected to a transceiver circuit through the exemplary connectors/solder pads along an edge of the circuit board 316.

The microphone 312 generates microphone signals that are conducted through a pair of antenna lines 330a and 330b, which may be connected to a differential amplifier 350 through the exemplary connectors/solder pads along an edge of the circuit board 316. The microphone 312 can be spaced apart from the RF antenna 314 by a distance of less than a half wavelength of a resonant frequency of the radiating plane 317, and may be spaced less than one thirty-second of the resonant frequency or immediately adjacent to the radiating plane 317. The close proximity of the microphone 312 to the radiating plane 317 can result in the microphone 312 and the microphone lines 330a and 330b being subjected to substantial electrical interference from the antenna 314 and its feed and grounding lines 321 and 323.

To reduce coupling of the electrical interference from the antenna 314 into the microphone lines 330a-b and the microphone signals carried therethrough, a major length of the microphone lines 330a-b extends away from the RF antenna 314 in the direction that is perpendicular to a major direction 324 of resonant current flow in the radiating plane 317 when transmitting. The microphone lines 330a-b may be further laid out on the circuit board 316 so that substantially equal amounts of electrical interference from the antenna 314 and/or the feed and grounding lines 321 and 323 are coupled into the microphone signal. Such configuration of the microphone lines 330a-b to provide substantially equal/balanced electrical interference can enable such electrical interference to be more completely filtered by the differential amplifier 350 to produce a microphone signal 352 that has a substantially attenuated interference component therein. The differential amplifier 350 amplifies the differential signal between the microphone lines 330a-b and, thereby, rejects interference signals that are common between the microphone lines 330a-b (i.e., common-mode interference rejection). Alternatively or additionally, the microphone lines 330 a-b may be coupled to the primary of a transformer, with the microphone signal being taken from the secondary so as to provide common-mode interference rejection in the microphone signal.

In the exemplary embodiment, the microphone lines 330a-b both form a serpentine pattern on the circuit board 316 that repetitively crosses over/under one another at a distance that is less than one twenty-fourth of the wavelength of the resonant frequency of the radiating plane 317 (e.g., less than about 6.6 mm for 1900 MHz), and which maybe much less than one thirty-second of the wavelength, to increase balance between the microphone lines 330a-b in the amount of electrical interference from the radiating plane 317 that is combined with the microphone signal carried therethrough. An insulation layer 340 is formed on the circuit board 316 between the microphone lines 330a-b to electrically insulate one line 330a from the other line 330b. Alternatively, an insulation pattern may be formed to insulate the lines 330a-b at crossover points in the serpentine pattern. The serpentine pattern may improve the balance of antenna interference between the microphone lines 330a-b so that the antenna interference can be more completely filtered through common-mode interference rejection using, for example, the differential amplifier 350.

Figure 4:
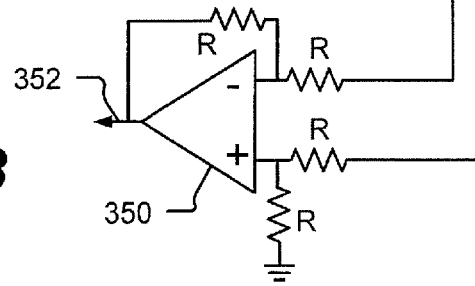
FIG. 4 is a front view of another combined microphone and antenna module including a unitary circuit board with a RF antenna and a microphone attached thereto in accordance with some other embodiments of the present invention.
Figure 4:
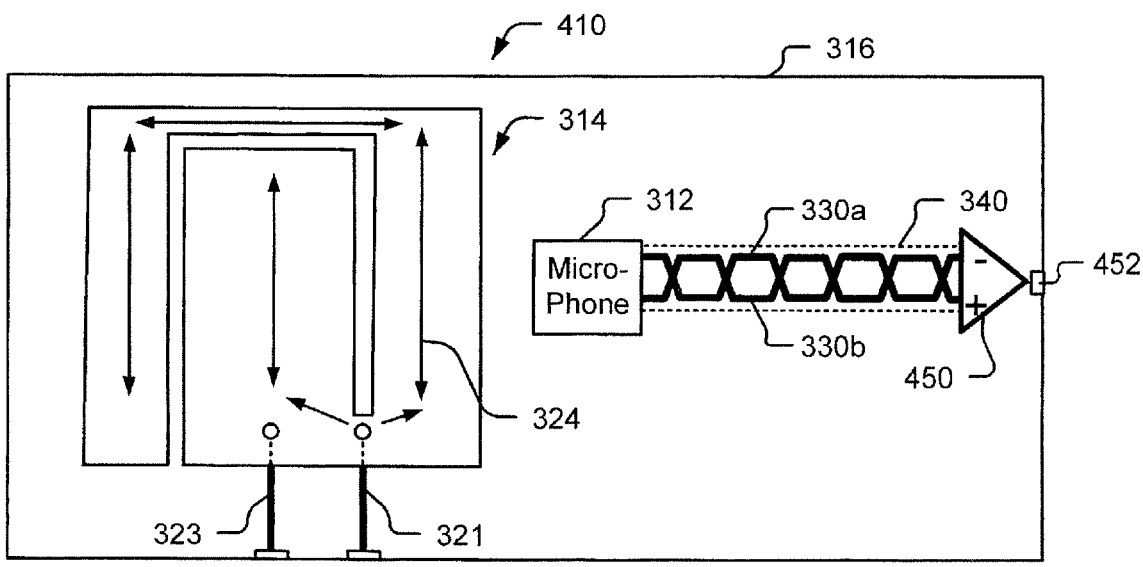

FIG. 4 is a front view of another combined microphone and antenna module 410 that includes a unitary circuit board 316 with a RF antenna 314 and a microphone 312 attached thereto in accordance with some embodiments of the present invention. The module 410 is similar to the module 310 of FIG. 3, except that a differential amplifier 450 is now onboard the circuit board 316. With reference to FIG. 4, the microphone lines 330a-b extend with a serpentine pattern from the microphone 312 to the differential amplifier 450 attached to the circuit board 316. The differential amplifier 450 outputs a filtered microphone signal at connector/solder pad 452. Accordingly, as described above, the microphone lines 330a-b are configured to enhance balancing of antenna interference therebetween so that interference in the microphone signal can be more completely rejected/attenuated by the differential amplifier 450. It is to be understood that the relative size/thickness of the illustrated components may be exaggerated for ease of illustration and description.

Figure 5:
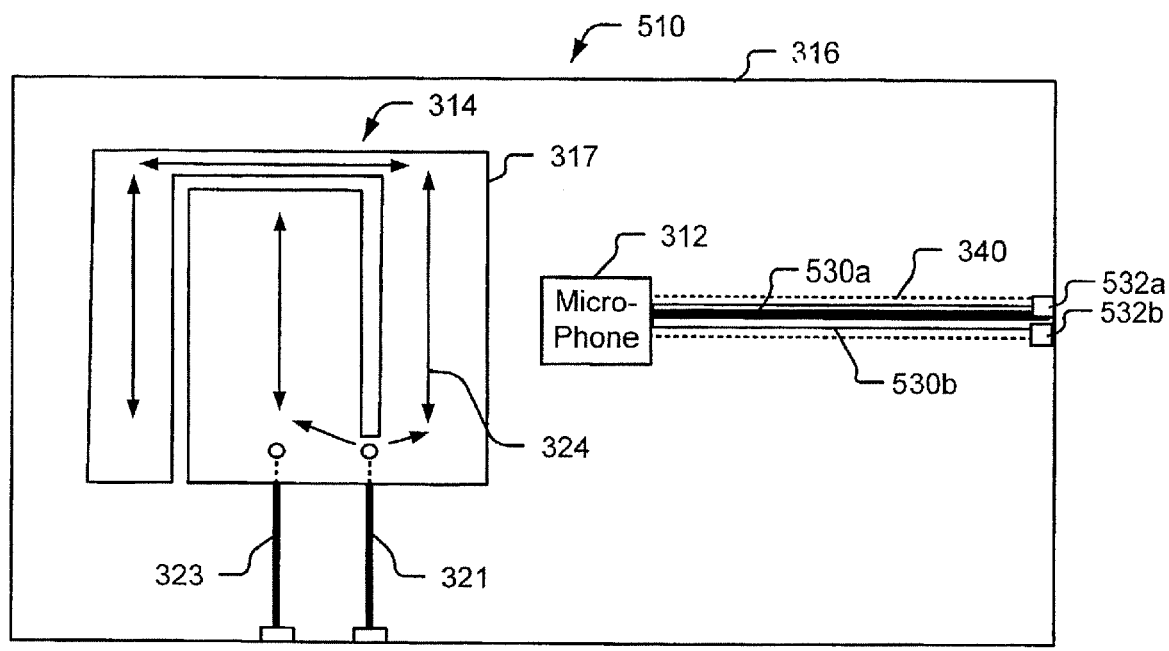
FIG. 5 is a front view of another combined microphone and antenna module including a unitary circuit board with a RF antenna and a microphone attached thereto in accordance with some other embodiments of the present invention.

FIG. 5 is a front view of another combined microphone and antenna module 510 including a unitary circuit board 316 with a RF antenna 314 and a microphone 312 attached thereto in accordance with some other embodiments of the present invention. The module 510 is similar to the module 310 of FIG. 3, except for differences in the configuration of the microphone lines. It is to be understood that the relative size/thickness of the illustrated components may be exaggerated for ease of illustration and description.

With reference to FIG. 5, at least a major portion of the microphone lines 530a-b extend parallel to one another, and one of the microphone lines 530a-b may at least partially overlie the other one of the microphone lines 530a-b with an insulation layer 340 therebetween, and which may increase balance between the microphone lines 530a-b in the amount of electrical interference from the radiating plane 317 that is combined with the microphone signal and output therewith at the nodes/connectors/solder pads 532 along an edge of the circuit board 316. Accordingly, a differential amplifier (e.g., offboard/onboard differential amplifier 350/450) can more completely reject/attenuate antenna interference in the microphone signal. At least a major portion of the microphone lines 530a-b can extend in a direction that is perpendicular to a major direction 324 of resonant current flow in the radiating plane 317 so as to reduce the electrical interference from the radiating plane 317 that is coupled into the microphone signal.

Figure 6:
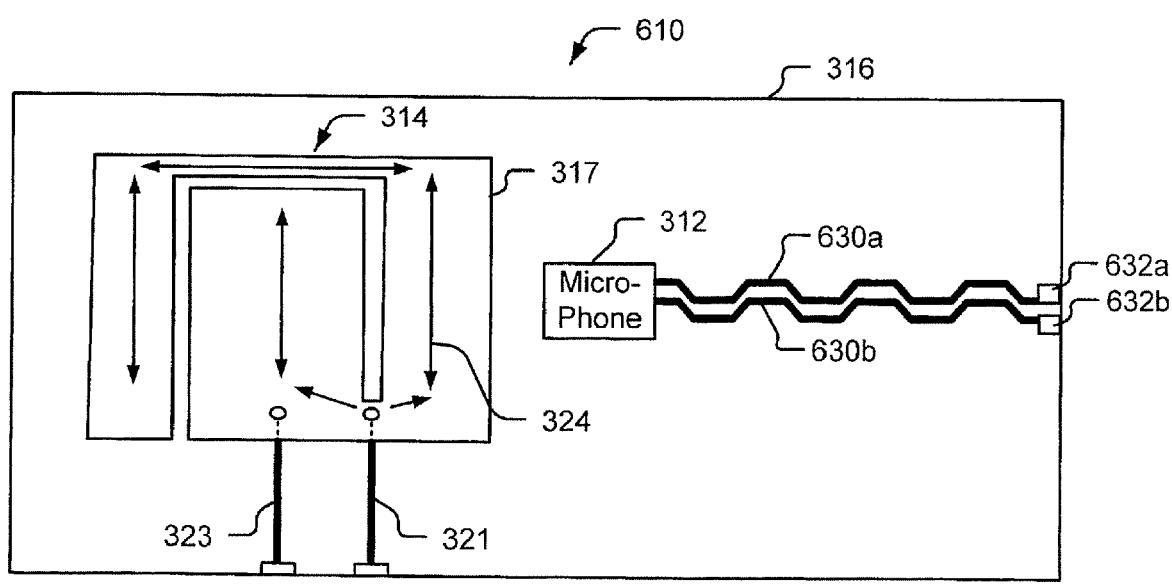
FIG. 6 is a front view of another combined microphone and antenna module including a unitary circuit board with a RF antenna and a microphone attached thereto in accordance with some other embodiments of the present invention.

FIG. 6 is a front view of another combined microphone and antenna module 610 including a unitary circuit board 316 with a RF antenna 314 and a microphone 312 attached thereto in accordance with some other embodiments of the present invention. The module 610 is similar to the module 310 of FIG. 3, except for differences in the configuration of the microphone lines. It is to be understood that the relative size/thickness of the illustrated components may be exaggerated for ease of illustration and description.

With reference to FIG. 6, at least a major portion of microphone lines 630a-b extend parallel to one another from the microphone 314 to the nodes/connectors/solder pads 632a-b which may be along an edge of the circuit board 316. At least a major portion of the microphone lines 630a-b form a serpentine pattern primarily extending in a longitudinal direction on the circuit board 316 and which reverse direction in a lateral direction at distances that may be less than one twenty-fourth of the wavelength of the resonant frequency of the radiating plane 317 (e.g., less than about 6.6 mm for 1900 MHz), and may be less than one thirty-second of the wavelength, to increase balance between the microphone lines 630a-b in the amount of electrical interference from the radiating plane 317 that is coupled into the microphone signal carried therethrough. Accordingly, a differential amplifier (e.g., offboard/onboard differential amplifier 350/450) can more completely reject/attenuate antenna interference in the microphone signal. At least a major portion of the microphone lines 630*a-b* can extend in a direction that is perpendicular to a major direction 324 of resonant current flow in the radiating plane 317 so as to reduce the electrical interference from the radiating plane 317 that is coupled into the microphone signal.

FIG. 7 is a front view of another combined microphone and antenna module 710 including a unitary circuit board 716 with a RF antenna 314 and a microphone 312 attached to opposite sides of the circuit board 716 in accordance with some other embodiments of the present invention. The combined microphone and antenna module 710 may be similarly configured to the module 210 shown in FIG. 2. It is to be understood that the relative size/thickness of the illustrated components may be exaggerated for ease of illustration and description.

Because the microphone 312 and the antenna 314 are attached to opposite sides of the circuit board 716, the combined microphone and antenna module 710 may be more compact and use less surface area of the printed circuit 716, and may thereby enable further size reduction in a wireless terminal utilizing the module 710.

The circuit board 716 may include a conductive shielding layer that is positioned between the microphone 312 and the antenna 314 to reduce coupling of electrical interference into the microphone signal. Accordingly, positioning the microphone 312 and the antenna 314 on opposite sides of the circuit board 716 may enable further shielding of electrical interference from the microphone signal.

FIG. 8 is a block diagram of a cellular wireless communication terminal 800 with a combined antenna and microphone module 110 which may include many of the elements described above for FIG. 1. Referring to FIG. 8, the exemplary wireless terminal 800 includes a speaker 122, a general controller 130, a communication controller 132, a transceiver 134, a combined antenna and microphone module 110, a display 124, a keypad 126, and may include further functional elements, such as a camera 802. It is to be understood that the relative size/thickness of the illustrated components may be exaggerated for ease of illustration and description.

The general controller 130 can be configured to control various elements of the wireless terminal 800 to provide user functionality, such as for organizing and maintaining a phonebook and other user contact information, a calendar, a music player/recorder (e.g., MP3 player), camera/video functionality, and/or e-mail and instant messaging functionality. The communication controller 132 may be configured to encode/decode and control communications through the transceiver 134 and the RF antenna 114 according to one or more cellular protocols, which may include, but are not limited to, GSM communication, General Packet Radio Service (GPRS), enhanced data rates for GSM evolution (EDGE), code division multiple access (CDMA), wideband-CDMA, CDMA2000, and/or Universal Mobile Telecommunications System (UMTS). The communication controller 132 may alternatively or additionally encode/decode and control communications through the transceiver 134 and the antenna 114, and/or through another transceiver and antenna, according to one or more short range communication protocols, which may include, but are not limited to Bluetooth and/or WiFi such as IEEE 802.11b-g. The transceiver 134 is configured to excite the antenna 114 so as to transmit within one or more RF frequency ranges, such as one or more of the RF frequency ranges describe herein.

In the drawings and specification, there have been disclosed embodiments of the invention and, although specific terms are employed, they are used in a generic and descriptive sense only and not for purposes of limitation, the scope of the invention being set forth in the following claims. Thus, the foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An electronic device comprising:
   a unitary circuit board;
   a radio-frequency (RF) antenna attached to the circuit board and including a radiating plane and a ground plane, wherein a feed line on the circuit board is connected to the radiating plane and a ground line on the circuit board is connected to the ground plane; and
   a microphone attached to the circuit board and spaced apart from the RF antenna by a distance of less than a half wavelength of a resonant frequency of the radiating plane, wherein the microphone is configured to generate a microphone signal through a pair of microphone lines on the circuit board,
   wherein the radiating plane comprises a planar F radiating plane; and
   wherein the pair of microphone lines extend away from the RF antenna along a major length thereof in a direction perpendicular to a direction of major resonant current flow in the planar F radiating plane while transmitting to reduce electrical interference from the radiating plane that is combined with the microphone signal on the microphone lines.

2. The electronic device of claim 1, wherein the RF antenna and the microphone are attached to opposite sides of the circuit board.

3. The electronic device of claim 2, wherein the RF antenna and the microphone are substantially aligned to one another on the opposite sides of the circuit board.

4. The electronic device of claim 1, further comprising:
   a transmitter circuit configured to drive the radiating plane through the feed and ground lines to transmit RF signals therefrom; and
   a communication encoder connected to the transmitter circuit and configured to encode communication signals for transmission by the radiating plane.

5. The electronic device of claim 4, wherein the transmitter circuit is configured to drive the radiating plane through the feed and ground lines to transmit RF signals at a cellular communication frequency.

6. The electronic device of claim 4, wherein the feed and ground lines are parallel to one another and extend along a major length thereof in a direction that is perpendicular to a major length of the pair of microphone lines to reduce electrical interference from the feed and ground lines that is combined with the microphone signal on the microphone lines.

7. The electronic device of claim 4, further comprising:
   a speaker; and
   a mobile terminal housing, wherein the speaker is positioned within a top portion of the mobile terminal housing, the RF antenna and microphone are positioned within an opposite bottom portion of the mobile terminal housing, and the transmitter circuit and the communication encoder are enclosed with the mobile terminal housing.

8. An electronic device comprising:
a unitary circuit board;
a radio-frequency (RF) antenna attached to the circuit board and including a radiating plane and a ground plane, wherein a feed line on the circuit board is connected to the radiating plane and a ground line on the circuit board is connected to the ground plane; and
a microphone attached to the circuit board and spaced a art from the RF antenna by a distance of less than a half wavelength of a resonant frequency of the radiating plane, wherein the microphone is configured to generate a microphone signal through a pair of microphone lines on the circuit board,
wherein the pair of microphone lines extend parallel to one another and one of the microphone lines overlies the other one of the microphone lines with an insulation material therebetween to increase balance between the microphone lines in amount of electrical interference from the radiating plane that is combined with the microphone signal on the microphone lines.

9. An electronic device comprising:
a unitary circuit board;
a radio-frequency (RF) antenna attached to the circuit board and including a radiating plane and a ground plane, wherein a feed line on the circuit board is connected to the radiating plane and a ground line on the circuit board is connected to the ground
a microphone attached to the circuit board and spaced apart from the RF antenna by a distance of less than a half wavelength of a resonant frequency of the radiating plane, wherein the microphone is configured to generate a microphone signal through a pair of microphone lines on the circuit board,
wherein one of the microphone lines forms a serpentine pattern on the circuit board and repetitively crosses over/under the other one of the microphone lines at distances that are less than one twenty-fourth of a wavelength of the resonant frequency of the radiating plane to increase balance between the microphone lines in amount of electrical interference from the radiating plane that is combined with the microphone signal on the microphone lines.

10. The electronic device of claim 9, wherein both of the microphone lines form a serpentine pattern on the circuit board that repetitively crosses over/under one another at distances that are less than one twenty-fourth of a wavelength of the resonant frequency of the radiating plane to increase balance between the microphone lines in amount of electrical interference from the radiating plane that is combined with the microphone signal on the microphone lines.

11. An electronic device comprising:
a unitary circuit board;
a radio-frequency (RF) antenna attached to the circuit board and including a radiating plane and a ground plane, wherein a feed line on the circuit board is connected to the radiating plane and a ground line on the circuit board is connected to the ground plane; and
a microphone attached to the circuit board and spaced apart from the RF antenna by a distance of less than a half wavelength of a resonant frequency of the radiating plane, wherein the microphone is configured to generate a microphone signal through a pair of microphone lines on the circuit board,
wherein the pair of microphone lines extend parallel to one another and form a serpentine pattern primarily extending in a longitudinal direction on the circuit board and which reverses direction in a lateral direction at distances that are less than one twenty-fourth of the wavelength of the resonant frequency of the radiating plane to increase balance between the microphone lines in amount of electrical interference from the radiating plane that is combined with the microphone signal on the microphone lines.

12. An electronic device comprising:
a unitary circuit board;
a radio-frequency (RF) antenna attached to the circuit board and including a radiating plane and a ground plane, wherein a feed line on the circuit board is connected to the radiating plane and a ground line on the circuit board is connected to the ground plane; and
a microphone attached to the circuit board and spaced apart from the RF antenna by a distance of less than a half wavelength of a resonant frequency of the radiating plane, wherein the microphone is configured to generate a microphone signal through a pair of microphone lines on the circuit board,
wherein the microphone comprises a microelectrical-mechanical system (MEMS) device that is attached to the circuit board at a distance from the RF antenna of no more than one thirty-second of a wavelength of the resonant frequency of the radiating plane.

13. A wireless communication terminal comprising:
a unitary circuit board;
a radio-frequency (RF) antenna attached to the circuit board and including a radiating plane and a ground plane, wherein a feed line on the circuit board is connected to the radiating plane and a ground line on the circuit board is connected to the ground plane;
a microphone attached to the circuit board and spaced apart from the RF antenna by a distance of less than a half wavelength of a resonant frequency of the radiating plane, wherein the microphone is configured to generate a microphone signal through a pair of microphone lines on the circuit board;
a transmitter circuit configured to drive the radiating plane through the feed and ground lines to transmit RF signals at a cellular communication frequency therefrom; and
a communication encoder connected to the transmitter circuit and configured to encode communication signals for transmission by the radiating plane,
wherein the pair of microphone lines extend parallel to one another and one of the microphone lines overlies the other one of the microphone lines with an insulation material therebetween to increase balance between the microphone lines in amount of electrical interference from the radiating plane that is combined with the microphone signal on the microphone lines.

14. The wireless communication terminal of claim 13, wherein the RF antenna and the microphone are attached to opposite sides of the circuit board.

15. The wireless communication terminal of claim 13, wherein the transmitter circuit is configured to drive the radiating plane through the feed and ground lines to transmit RF signals at a cellular communication frequency.

16. A wireless communication terminal comprising:
a unitary circuit board;

a radio-frequency (RF) antenna attached to the circuit board and including a radiating plane and a ground plane, wherein a feed line on the circuit board is connected to the radiating plane and a ground line on the circuit board is connected to the ground plane;

a microphone attached to the circuit board and spaced apart from the RF antenna b a distance of less than a half wavelength of a resonant frequency of the radiating plane, wherein the microphone is configured to generate a microphone signal through a pair of microphone lines on the circuit board;

a transmitter circuit configured to drive the radiating plane through the feed and ground lines to transmit RF signals at a cellular communication frequency therefrom; and a communication encoder connected to the transmitter circuit and configured to encode communication signals for transmission by the radiating plane, wherein both of the microphone lines form a serpentine pattern on the circuit board that repetitively crosses over/under one another at distances that are less than one twenty-fourth of a wavelength of the resonant frequency of the radiating plane to increase balance between the microphone lines in amount of electrical interference from the radiating plane that is combined with the microphone signal on the microphone lines.

17. The wireless communication terminal of claim 16, wherein the RF antenna and the microphone are attached to opposite sides of the circuit board.

18. A wireless communication terminal comprising:
a unitary circuit board;
a radio-frequency (RF) antenna attached to the circuit board and including a radiating plane and a ground plane, wherein a feed line on the circuit board is connected to the radiating plane and a ground line on the circuit board is connected to the ground plane;
a microphone attached to the circuit board and spaced apart from the RF antenna by a distance of less than a half wavelength of a resonant frequency of the radiating plane, wherein the microphone is configured to generate a microphone signal through a pair of microphone lines on the circuit board;
a transmitter circuit configured to drive the radiating plane through the feed and ground lines to transmit RF signals at a cellular communication frequency therefrom;
a communication encoder connected to the transmitter circuit and configured to encode communication signals for transmission by the radiating plane; and
a differential amplifier that differentially combines the microphone signal on the microphone lines to generate a differential microphone signal,
wherein the RF antenna and the microphone are attached to opposite sides of the circuit board;
wherein the pair of microphone lines extend away from the RF antenna along a major length thereof in a direction perpendicular to a direction of major resonant current flow in the planar F radiating plane while transmitting to reduce electrical interference from the radiating plane that is combined with the microphone signal on the microphone lines; and
wherein both of the microphone lines form a serpentine pattern on the circuit board that repetitively crosses over/under one another at distances that are less than one twenty-fourth of a wavelength of the resonant frequency of the radiating plane to increase balance between the microphone lines in amount of electrical interference from the radiating plane that is combined with the microphone signal on the microphone lines and increase an amount of common mode rejection of the electrical interference by the differential amplifier.

* * * * *

UNITED STATES PATENT AND TRADEMARK OFFICE
CERTIFICATE OF CORRECTION

PATENT NO.       : 7,728,779 B2                                        Page 1 of 1
APPLICATION NO.  : 11/968676
DATED            : June 1, 2010
INVENTOR(S)      : Körner It is certified that error appears in the above-identified patent and that said Letters Patent is hereby corrected as shown below:

In the Claims:

Column 13, Claim 8, Line 13: Please correct "a art" to read -- apart --

Column 13, Claim 9, Line 33: Please correct "the ground"
                             to read -- the ground plane; and --

Column 15, Claim 16, Line 7: Please correct "b a" to read -- by a --

Signed and Sealed this

Sixteenth Day of November, 2010

David J. Kappos
*Director of the United States Patent and Trademark Office*